Feb. 8, 1944.      C. R. BUSCH      2,340,927
BRAKE RIGGING AND/OR RAILWAY CAR TRUCK
Filed May 15, 1941      3 Sheets-Sheet 1
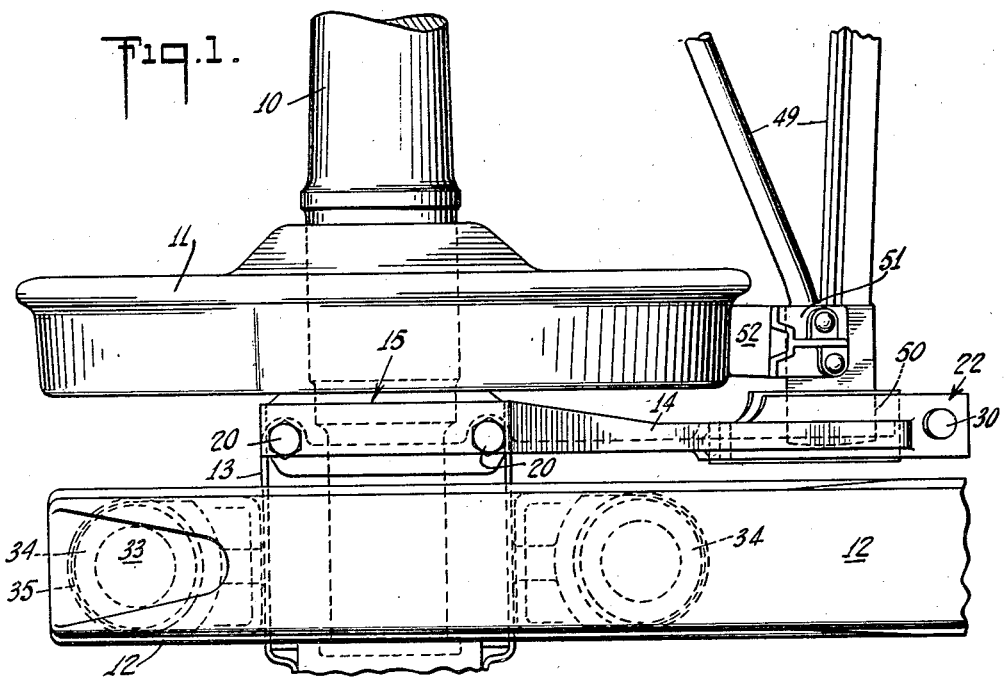
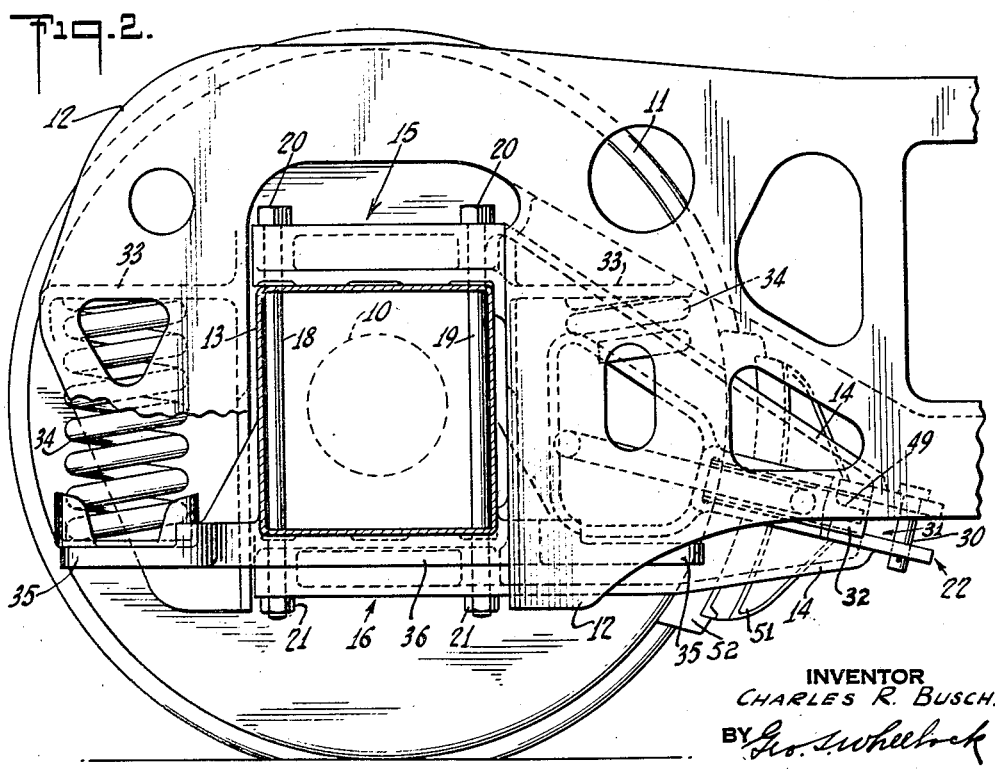
INVENTOR
CHARLES R. BUSCH.
BY Geo. A. Wheelock
ATTORNEY

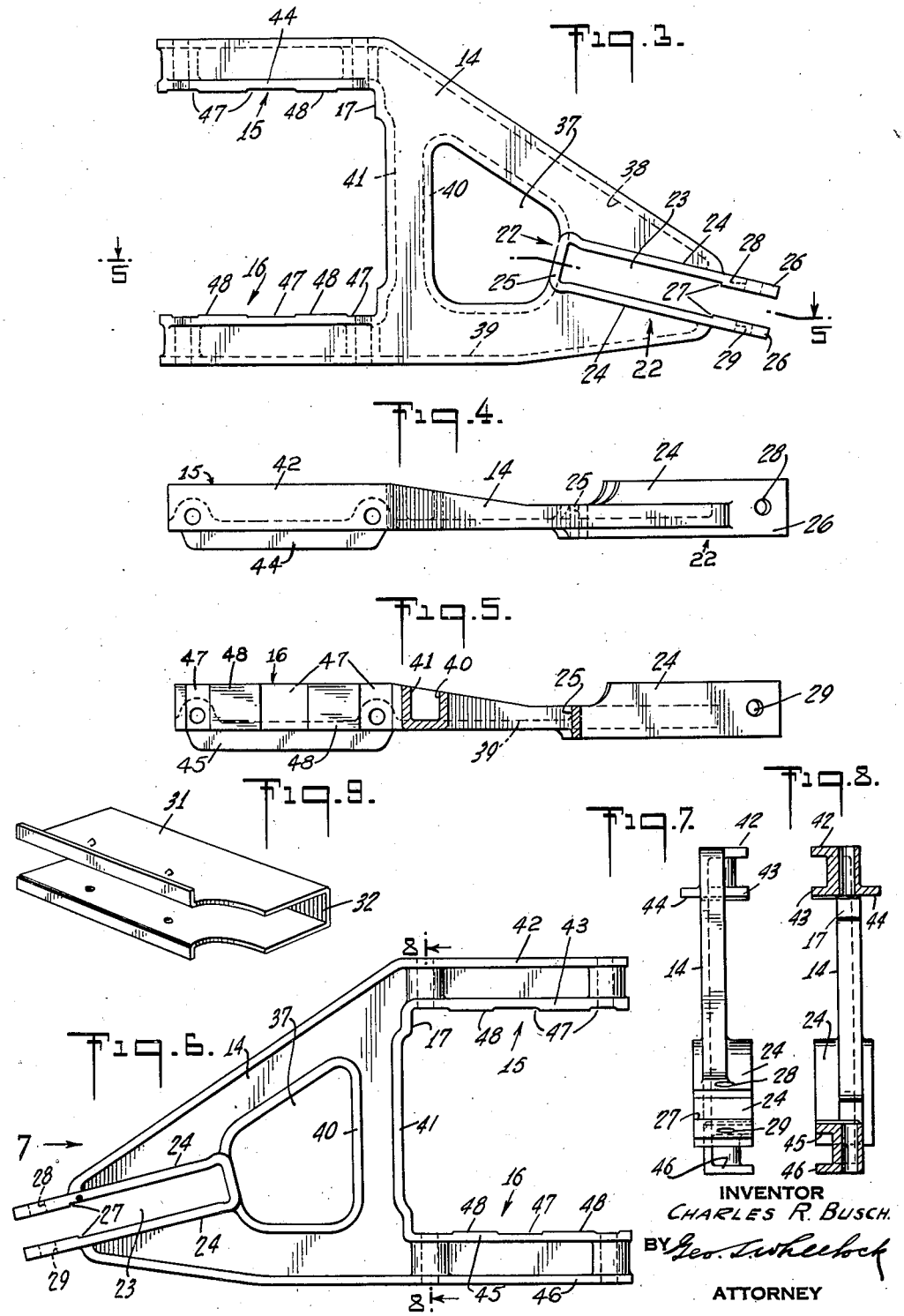

Feb. 8, 1944. C. R. BUSCH 2,340,927
BRAKE RIGGING AND/OR RAILWAY CAR TRUCK
Filed May 15, 1941 3 Sheets-Sheet 3
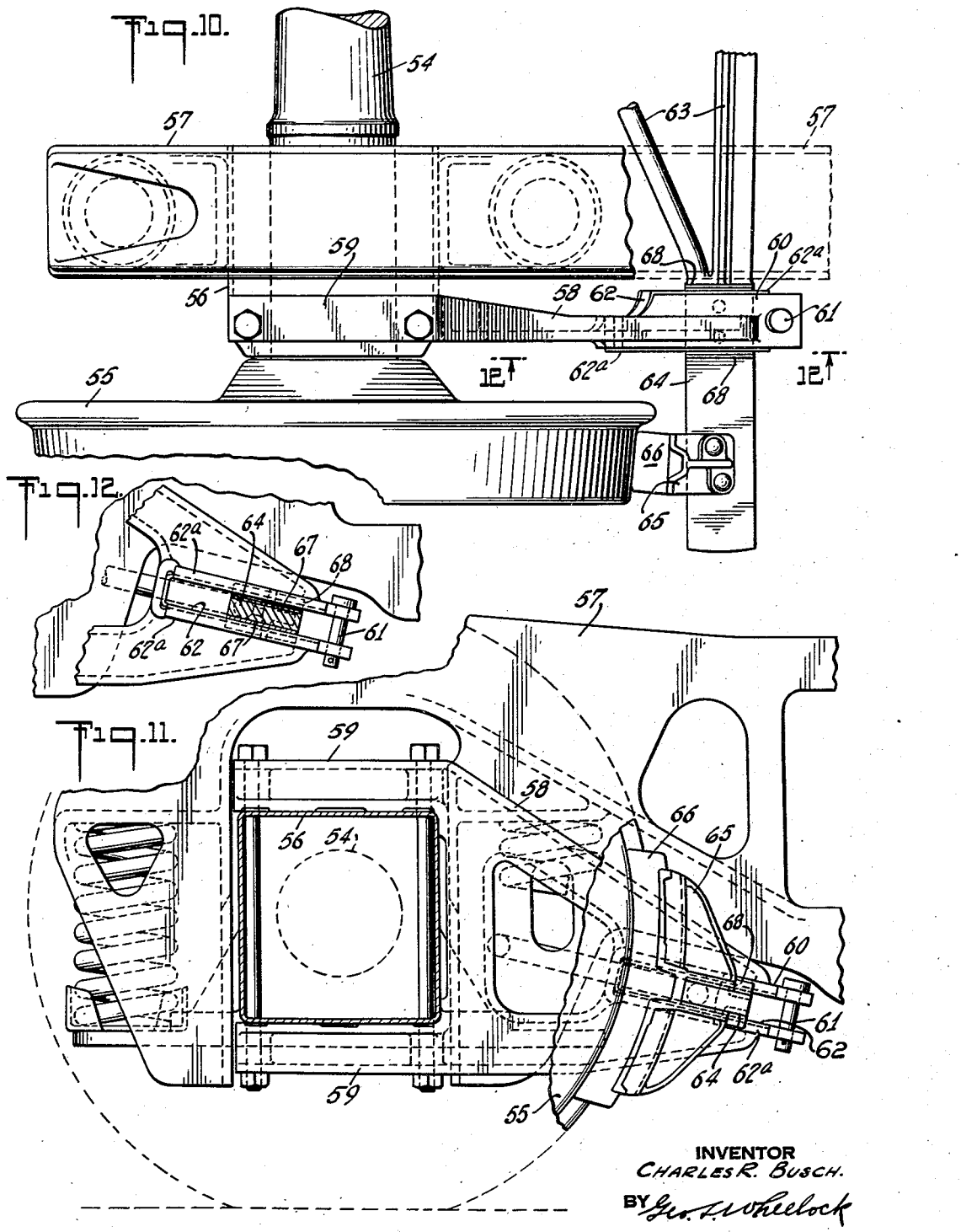
INVENTOR
CHARLES R. BUSCH.
BY Geo. F. Wheelock
ATTORNEY Patented Feb. 8, 1944

2,340,927

UNITED STATES PATENT OFFICE 2,340,927

BRAKE RIGGING AND/OR RAILWAY CAR TRUCK

Charles R. Busch, Orange, N. J., assignor to Buffalo Brake Beam Company, New York, N. Y., a corporation of New York Application May 15, 1941, Serial No. 393,581

11 Claims. (Cl. 188—212)

This invention relates to brake rigging and/or railway car trucks, more especially, but not necessarily, adapted for high-speed service, and to a type of truck wherein the spring-suspension for the truck side frames is located at the separate journal boxes themselves, or at the same in combination with the usual spring-suspension of the car body, by means of a bolster guided in the ordinary truck side frames. In such types the truck side frames are mounted on cushioning springs and move vertically within the limits of movement of the springs, which movements range approximately from one and one-half inches to four inches, depending upon the type and construction of the springs used, thus making it unwise to support the brakes or brake rigging from the side frames of such type of trucks.

Recognizing the difficulties encountered in the above connection, it is proposed under the present invention to suspend the brake rigging from the journal boxes of the truck, each of which boxes is definitely fixed or static with relation to the axle or wheel journals, each side frame of the truck preferably to have its spring-suspension such that its up and down movements will not in the least affect the position of the brake beam relative to the axis of a car wheel. It is also proposed hereunder to support and guide the brake and maintain it in operative position according to the principles disclosed and claimed in my prior patents, with one important difference, that is, that instead of supporting the brakes from the side frames, they are supported from the static journal boxes, and it is aimed to do this, whether the brakes are supported outboard or inboard of the wheels. The stationary means for supporting the brake can be obtained by journal boxes located either inboard or outboard of the car wheels, and the present construction is applicable to a railway car having two, four, six or eight wheels per truck, for either inside- or outside-located brakes or a combination of both. Among such prior patents may be noted patent to C. R. Busch, No. 2,170,112, dated August 22, 1939, as well as other patents to him bearing the same date, and reference may be had also to his copending application Ser. No. 209,679, filed May 24, 1938 and issued as Patent No. 2,269,618 on Jan. 13, 1942, relating to car trucks for brake beams of clasp type.

With the preceding and other objects in view, the present invention consists of certain features of construction and combination of parts to be hereinafter described and then claimed with reference to the accompanying drawings illustrating one embodiment of the invention, and in which:

Figure 1 is a plan of a fragmentary portion of a car truck, parts in broken lines, showing one wheel-and-axle assembly, a brake beam and a side frame sufficient to disclose the present improvements associated therewith;

Fig. 2 is a side elevation showing the same parts as in Fig. 1, the journal box being shown in section, and the axle and other parts being indicated in broken lines;

Fig. 3 is a side elevation, parts in broken lines, of the bracket-member, which is adapted to be statically supported by the journal box;

Fig. 4 is a top plan of the bracket-member;

Fig. 5 is a section on the line 5—5 of Fig. 3;

Fig. 6 is a side elevation of the bracket-member as viewed from the side opposite that shown in Fig. 3;

Fig. 7 is an end view of the bracket-member shown in Fig. 6, as viewed in the direction of the arrow 7;

Fig. 8 is a vertical section of the bracket-member on the line 8—8, Fig. 6, viewed in the direction of the arrows;

Fig. 9 is a perspective view of a member for resisting wear between the brake beam and its guide;

Fig. 10 is a plan view similar to Fig. 1, but showing the invention as applied inboard of a wheel;

Fig. 11 is a side elevation of Fig. 10, partly in broken lines; and

Fig. 12 is a sectional detail on line 12—12, Fig. 10.

Referring to Figs. 1 and 2, the axle 10 and car wheel 11 constitute a wheel-and-axle assembly, and it will be understood that there are similar assemblies, depending upon the number of wheels used on the truck. A truck side frame 12 is illustrated, which is preferably allowed an up-and-down movement or range of travel which is in excess of that allowed where the side frames directly support the brake. One journal box 13 is illustrated, which may be of any well-known construction, to permit the journal of the axle 10 to be mounted and rotate therein.

A bracket-member 14 is shown in Figs. 1 and 2 as located at the outboard side of the wheel 11, although with proper modification it may be located at the inboard side. Preferably, the member 14 is made from a casting of steel or other suitable metal, but it is obvious that it may be forged or built up of plates welded or otherwise firmly secured together to constitute a unitary member. The construction of such member 14 is more clearly illustrated in Figs. 3–8, inclusive.

The member 14 is provided with arms or jaws 15, 16, which are preferably integral with it and are here shown as in a pair providing means for supporting the member 14 from the journal box 13. To this end, the jaws 15, 16 are separated sufficiently to embrace the box with a snug fit by bearing upon the top and bottom of the box. The jaws are preferably parallel with each other, and as they extend away from the edge 17 of the main body of member 14, preferably in the same plane as the body, three angularly-arranged bearing surfaces are provided for engaging three corresponding sides of the journal box 13.

In the construction illustrated, the jaws 15, 16 are provided with holes, through which, as shown in Figs. 1 and 2, bolts 18, 19 may pass vertically, they also extending through the top and bottom of the journal box, with their heads 20 seated upon the upper surface of arm or jaw 15, and their lower ends being screw-threaded to receive tightening nuts 21, thereby to secure the member 14 rigidly to the journal box when they are screwed home against the bottom. The axle is then between the bolts.

Each such bracket-member is provided with a brake beam mounting means and guide 22, preferably formed in one piece with the bracket-member 14, the means 22 generally comprising a slot 23, which is defined by flat members 24, which preferably project as flanges beyond both sides of member 14. It will be seen that slot 23 is inclined downwardly and outwardly with respect to the arms 15, 16, its lower end preferably being open, as shown, in a direction away from the arms or jaws 15, 16, that is, in a direction away from the journal box to which member 14 is rigidly secured. The slot 23 preferably has an inclination of 12°–14° from the horizontal, as that has been found to be good practice in the use of such a guide slot, and preferably extends in alignment with the axis of the adjacent car wheel or axle, so that the central longitudinal axis of the slot extends in a direction radially, as it were, from the axle or wheel axis. The length of the slot should be at least as long as is required by the travel of the end of a brake beam therein.

The adjacent inner ends of the guide-flanges or members 24 are connected by a transverse rib-portion 25. Said flanges 24 and the rib-portion 25 reinforce the strength of member 14 around the slot. The outer ends of the flat guide-members or flanges 24 project beyond the terminal of member 14 as a pair of spaced thickened lips 26 which provide shoulders 27 at the top and bottom of the slot 23. The projecting lips are provided with registering holes 28, 29 adapted to receive a movable or removable stop-pin 30, as shown in Figs. 1 and 2. The purpose of the slot 23 and the stop-pin 30 is quite similar to that disclosed and claimed in prior patent to Busch, 2,170,119, dated August 22, 1939, that is, for guiding a brake beam and preventing its falling to the track, yet allowing the convenient removal thereof.

For the purpose of resisting wear on the walls of the slot 23, a wear-member or lining 31 as shown in Fig. 9, may be employed, similar to what is disclosed and claimed in Busch's prior patent, 2,170,123, dated August 22, 1939. Such a lining is of harder metal than the slot-walls, and may be sprung or snapped into place. In this connection, there is a principal difference in that the slot 23 is not formed by a blind recess, that is, a groove or channel formed in a side frame or other member, but it opens out at the opposite surfaces of the guide-member 22, while the back wall 32 of the wear lining 31 closes the back of the slot 23, and may be said to be the back wall of the slot when the lining is in position. Such lining may be held in place in the same manner as in the last recited patent, one end thereof abutting the shoulders 27, Fig. 3.

The side frame or member 12 is spring-supported outboard of the wheel in some such manner as now described. The frame-member 12 is provided with spring-seats 33, shown in Fig. 2, for cushioning-springs 34 having such high amplitude of expansion as is preferably used for high-speed trucks. Seats 35 for the lower ends of the springs 34 may be formed by the ends of a seat-member 36 or a cross-piece, which is welded, riveted or otherwise rigidly attached to the bottom wall of the journal box 13, so as to extend transversely thereof. The seat-member 36 will thus be located outwardly from the bracket-member 14, which latter is therefore located between the side frame member 12 and the adjacent car wheel 11.

Referring more particularly to Figs. 3–8, inclusive, the bracket-member 14 is preferably provided with an ample opening 37 to lighten its weight, and the rib-portion 25 of the brake-beam guide is preferably located as shown so as to terminate at one edge of opening 37. Also for the sake of lightness, such as is consistent with strength, the bracket-member 14 preferably has a generally tapering formation away from the jaws or arms 15, 16, so as to be of less height around the slot, which has very strong reinforcement thereabout. To strengthen the body of member 14, the same is preferably provided with reinforcing ribs 38, 39, 40 and 41. The ribs 38, 39 extend along the more or less tapering edges of member 14, while the ribs 40, 41 extend more or less vertically towards the top and bottom of the said member. Furthermore, reinforcements 42, 43, 44 are formed on the arm or jaw 15, and reinforcements 45, 46 on the arm or jaw 16.

As more clearly shown in Figs. 3 and 6, depressed areas 47 are formed in spacial relation in the opposed surfaces of arms 15, 16, thereby leaving little flat raised bearing portions 48 between them. Therefore, the opposed faces of the jaws 15, 16 are preferably more or less undulating, so that compensation is made from the possibility that the mutually-opposed surfaces of the journal box and jaws may not be exactly parallel, which latter condition would be more or less the case of castings bearing one on the other.

In Figs. 1 and 2 one end of a brake beam 49 is illustrated, the beam to have at each end a guiding terminal 50, which works in the slot 23 when the brake is applied and released, such construction being disclosed and claimed in one or more of the patents hereinabove mentioned. Such terminal is usually protected by a wear cap or shoe, not shown. Upon the terminal 50 a suitable brake-head 51 is rigidly fixed to receive the brake-shoe 52 for engaging the tread of car wheel 11.

An adaptation of the present invention is shown in Figs. 10, 11 and 12, wherein the journal box and side frame are arranged inboard of the wheel, which is the case in some car trucks. Referring to said figures, the axle 54 and the wheel 55 constitute a wheel-and-axle assembly which supports the journal box 56, in which the axle rotates.

The side frame 57 may be supported in a similar manner to what is shown in Figs. 1 and 2.

The bracket-member 58 with its arms or jaws 59 constitute a unit similar to that previously described, and it is rigidly or stably supported upon the journal box 56 in a manner similar to that previously described, but is inboard instead of outboard of the wheel so as to be located between the inboard side frame 57 and the wheel 55. The member 58 is provided with a brake-beam guide 60 similar to that previously described, which guide is provided with a removable stop-pin 61. No further description of these parts in this adaptation of the invention appears to be required. However, important changes are made in these connections, as will now be explained.

Instead of using a wear lining for the guide 60, which has a longitudinal back wall, as previously described, in this adaptation the lining 62 is made from a strip of suitable metal, which is bent transversely so as to form a U with long arms, and the bent portion is received in the inner end of the guide-slot; said lining 62 therefore providing arms which extend towards the outer end of the slot, and there terminating as shown in Fig. 12. This will leave the guide-slot entirely open at each side and at the outer end, so that a brake beam 63 having an extended end 64, longer than the extended end previously described, may pass entirely through the guide-slot and project laterally of the truck far enough to receive a brake-head 65 and shoe 66 thereon. The head 65 is preferably riveted to the beam. The lining 62 may be held securely in position in various ways so that it can be removed, if required, and one way would be that previously described with reference to lining 31, or, if the shoulders are not used the position of the lining, when snapped into place, may be maintained partly by the removable stop-pin 61, which merely assists teats or projections formed on the lining and the spring action of the lining when it is in place. The arms of lining 62 preferably have edge flanges 62a, which engage opposite side surfaces of guide 60 when the lining is sprung into place.

A special brake beam and arrangement of parts thereon and cooperating therewith are preferably used in this particular adaptation of the invention, which is made the subject of a separate application pending concurrently herewith. It may here be stated that the object of making the brake beam 63 with a flat terminal or end-portion 64, which is of greater length than the terminal portion 50 before mentioned, is to enable such modified construction of brake beam to be used for guiding it either on a guide which is outboard of the adjacent car wheel or is inboard of the adjacent car wheel. In both cases, however, the brake head 65 and the shoe 66 will be supported on the terminal portion 64 in proper position for applying the braking pressure. Whether the brake beam such as shown in Figs. 10, 11 and 12 is supported inboard or outboard of the adjacent car wheel, the terminal portion 64 will extend entirely through and project beyond the guide, making it desirable that the brake beam be provided with wear coverings or plates 67 at top and bottom of the end-portion 64. These coverings preferably have flanges 68, as shown, that ride along the adjacent edges of the lining 62 when the brake beam is operated.

Various modifications of the present invention may be made by those skilled in the art, and some of such possible modifications are claimed in separate applications filed on even date herewith, without departing from the scope of the appended claims.

What I claim as new is:

1. Brake-supporting means for a railway truck, comprising a rigid member which when assembled with a truck will extend between a car wheel and a truck side frame, means independent of the side frame, including vertically spaced elements for securement to the top and bottom of a journal box, for fixing the member in a stable position in such location, and a brake-beam guide on such member extending for a length at least equivalent to the extent of travel of the beam.

2. Brake-supporting means for a railway truck, comprising an elongated rigid member which when assembled with a truck is supported independently of a truck side frame, means for supporting the member solely from one end, independently of said frame, in a stable position in relation to a car-wheel axis, and a brake-beam guide on the free opposite end of the member and extending, for substantial alignment thereof with said axis, for a length at least equivalent to the extent of travel of the beam.

3. Brake-supporting means for a railway truck, comprising an elongated rigid member which when assembled with a truck is supported independently of a truck side frame, means for supporting the member solely from one end in a stable position in relation to a car-wheel axis, and a brake-beam guide on the free opposite end of the member and extending for a length at least equivalent to the extent of travel of the beam, the guide inclined downwardly on said freed end and adapted to align with such wheel axis.

4. Brake-supporting means for a railway truck, comprising a rigid member which when assembled with a truck will extend between a car wheel and a truck side frame, supporting means for the member including a pair of jaws adapted to embrace a journal box of such truck and to be rigidly secured thereto, and a brake-beam guide on the member and extending for a length equivalent to the extent of travel of the beam; said jaws and guide located respectively at opposite ends of such member.

5. Brake-supporting means for a railway truck, comprising a rigid member which when assembled with a truck will extend between a car wheel and a truck side frame, supporting means for the member including a pair of jaws adapted to embrace a journal box of such truck and to be rigidly secured thereto, and a brake-beam guide on the member and extending for a length equivalent to the extent of travel of the beam; said jaws and guide located respectively at opposite ends of such member, and said guide including a slot which opens out through the adjacent extremity of the end having the guide.

6. In a railway car truck, the combination of a journal box and a removable brake-beam supporting-member stably mounted thereon and having a downwardly extending edge abutting against a downward lateral side of the box near the top and bottom of the box.

7. In a railway car truck, the combination of a journal box, a brake-beam supporting-member, a pair of jaws at one end of the member for embracing the box, and a brake-beam guide on the member and located at the opposite end.

8. In a railway car truck, the combination of a wheel-and-axle assembly, an axle journal box, a brake-beam supporting-member supported against and rigid with a lateral side of the box and extending laterally away from said side, and a side frame supported resiliently by the box, the supporting-member located between the wheel and side frame.

9. In a railway car truck, the combination of a wheel-and-axle assembly, an axle journal box, a brake-beam supporting-member, bolts passing through one end of the box and rigidly securing said member, a truck side frame, spring-seats supported by the other end of the box laterally of said member, and springs on the seats supporting the side frame.

10. In a railway car truck, the combination of a wheel-and-axle assembly, an axle journal box, a brake-beam supporting-member rigid with a lateral side of the box and projecting therefrom to extend longitudinally of the truck, and a side frame supported resiliently by the box, the supporting-member having a beam-guide on its projected end-portion extending at a downward inclination to the horizontal plane of the wheel axis.

11. Brake-supporting means, including a car-truck member having a brake-beam guiding-slot therethrough, so that the slot is open at opposite surfaces of the member, and a wear-plate of substantially U shape fitted in the slot, the other walls of the plate being at least the full width of said through slot and its intermediate wall closing one side of the slot.

CHARLES R. BUSCH.